United States Patent [19]
Akahane et al.

[11] Patent Number: 5,667,289
[45] Date of Patent: *Sep. 16, 1997

[54] BACKGROUND LIGHTING APPARATUS FOR LIQUID CRYSTAL DISPLAY

[75] Inventors: Fumiaki Akahane; Tooru Yagasaki; Tatsuaki Funamoto, all of Suwa, Japan

[73] Assignee: Seiko Epson Corporation, Tokyo, Japan

[*] Notice: The portion of the term of this patent subsequent to Jul. 14, 2009, has been disclaimed.

[21] Appl. No.: 864,772

[22] Filed: Apr. 7, 1992

Related U.S. Application Data

[63] Continuation-in-part of Ser. No. 525,408, May 18, 1990, Pat. No. 5,130,898.

[30] Foreign Application Priority Data

| May 18, 1989 | [JP] | Japan | 1-57274 |
| Sep. 29, 1989 | [JP] | Japan | 1-253863 |
| Feb. 27, 1990 | [JP] | Japan | 2-46356 |
| Apr. 8, 1991 | [JP] | Japan | 3-075093 |
| Sep. 17, 1991 | [JP] | Japan | 3-236347 |

[51] Int. Cl.$^6$ ............................................. F21V 8/00
[52] U.S. Cl. .................... 362/31; 362/27; 362/307; 362/330; 349/70
[58] Field of Search ........................ 362/31, 26, 32, 362/227, 235, 236, 237, 307, 311, 330, 343, 27; 359/49, 50

[56] References Cited

U.S. PATENT DOCUMENTS

| 3,892,959 | 7/1975 | Pulles | 362/31 |
| 3,968,584 | 7/1976 | Kingston | 362/31 |
| 4,568,179 | 2/1986 | Durbin et al. | 362/343 |
| 4,630,895 | 12/1986 | Abdala, Jr. et al. | 362/31 |
| 4,648,690 | 3/1987 | Ohe | 362/31 |
| 4,729,068 | 3/1988 | Ohe | 362/31 |
| 4,811,507 | 3/1989 | Blanchet | 362/31 |
| 4,842,378 | 6/1989 | Flasck et al. | 362/31 |
| 4,860,171 | 8/1989 | Kojima | 362/31 |
| 4,933,814 | 6/1990 | Sanai | 362/26 |
| 5,124,890 | 6/1992 | Choi et al. | 362/31 |
| 5,134,549 | 7/1992 | Yokoyama | 362/31 |
| 5,136,483 | 8/1992 | Schöniger et al. | 362/31 |

FOREIGN PATENT DOCUMENTS

| 587766 | 8/1926 | France | 362/31 |
| 1145934 | 5/1957 | France | 362/31 |
| 327493 | 3/1958 | France | 362/31 |
| 62105 | 3/1988 | Japan . | |
| 175301 | 7/1988 | Japan . | |
| 45002 | 2/1989 | Japan . | |
| 45003 | 2/1989 | Japan . | |
| 664193 | 1/1952 | United Kingdom | 362/31 |

OTHER PUBLICATIONS

Voltarc Technical Bulletin "Fluorescent Lamp", 1987.
Electronic Design, p. 47, Aug. 2, 1961.

*Primary Examiner*—James C. Yeung
*Assistant Examiner*—Alan Cariaso

[57] ABSTRACT

A background lighting apparatus includes a light entering edge surface around substantially the entire periphery of a highly internally reflecting transparent plate wherein light beams enter from peripheral light sources and travel toward the central portion of the plate and are dispersed and diffused by a diffusion system formed relative to the transparent plate. Uniformity of luminance provided from the background lighting apparatus is enhanced as a whole by increasing the incident quality of the input light beams into the transparent plate while easing the incident directivity of the light beams on the transparent plate with the overall substantial enhancement of luminance produced from the apparatus. Further, the temperature distribution on a liquid crystal panel positioned adjacent to the output surface of the background lighting apparatus is substantially uniform across the panel so that the transmission quality of the liquid crystal material, which is dependent upon ambient temperatures, is made substantially more uniform resulting in significantly higher levels of uniformity in luminance across the display as well as uniformity of displayed colors and gradations thereof emanating from the display panel.

20 Claims, 9 Drawing Sheets

BACKGROUND LIGHTING APPARATUS FOR LIQUID CRYSTAL DISPLAY

CROSS-REFERENCE TO RELATED APPLICATION

This application is a continuation-in-part of patent application Ser. No. 07/525,408 filed May 18, 1990 now U.S. Pat. No. 5,130,898.

BACKGROUND OF THE INVENTION

This invention relates to background lighting apparatus and more particularly to thin background light sources for liquid crystal panel displays, such as, employed in computers, word processors and LCD television sets and the like.

Figure 1:
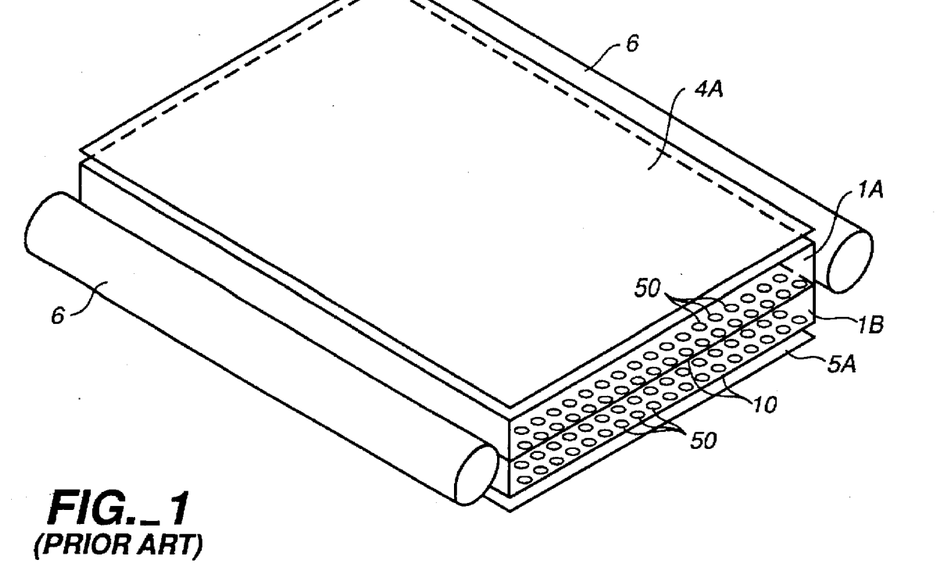
FIG. 1 is a perspective view of a conventional background lighting apparatus as known in the art.

In Japanese Laid Open No. 63-62105, there is described a background light system in which the irregular reflecting surface is provided with a pattern of milky white type, dispersion points on a transparent plate supported in the housing unit of the liquid crystal display. FIG. 1 discloses the irregular reflecting layer of the type disclosed in Japanese Laid Open No. 63-62105 comprising two or more transparent plates 1A and 1B, each having a pattern of milky white type of light diffusion pattern comprising a multiplicity of dots 50 formed on bottom reflecting surfaces 10 of plates 1A, 1B. The backlighting apparatus disclosed includes opposed light sources 6 for providing light to enter opposite end surfaces of dual plates 1A, 1B. Diffusion plate 4A permits the transmission of light beams from plates 1A, 1B as well as brings about diffusion of light beams that are not at the necessary critical angle for exiting the apparatus. Total reflecting plate 5A is of the white type for the dispersion and reflection of light back into plates 1A, 1B. This type of dispersion pattern and dispersion/reflection plate approach improves the quantity of light reflections, diffusion and dispersion but it does so at the expense of providing two or more plates 1 in order to increase the output efficiency of the background lighting apparatus. Furthermore, the luminous efficiency of this type of reflecting surface is low when employed in the rear portion of the liquid crystal display housing unit. In order to increase the brightness, a plurality of superimposed transparent plates 1A, 1B are utilized each having a light diffusion pattern for diffusing the light beams. However, the thickness of the display becomes large. Further, the dispersion and diffusion of light and resulting brightness in the reflecting surface or multiple surfaces of the transparent plates is not achieved resulting in unevenness or nonuniformity in brightness in back lighting and, correspondingly, in the displayed image.

In general, a background lighting apparatus for a liquid crystal display is required to have uniform brightness across its output facet or face. In this type of apparatus, wherein light enters from an edge or end face of the transparent plate of the apparatus and is guided internally in the transparent plate to form a plate type lighting apparatus, such as in the case of this invention, the total quantity of light output can be increased by increasing the quantity of irregular reflection occurring relative to the irregular reflecting surface or portion provided relative to the transparent plate thereby resulting a brighter background light. However, as the quantity of irregular reflection is increased, the brightness level quickly decreases with distance from the light source so that nonuniformity in the overall brightness of the light output from the lighting apparatus increases. In order to counteract this phenomenon, a pattern comprising an irregular reflecting surface or portion and a totally reflecting portion are arranged in a manner to achieve uniform light output with a high level of brightness. As previously indicated, this has been accomplished in the past by a patterned surface on a transparent plate as described in Japanese Laid Open No. 63-62105. However, it is difficult to increase the area ratio of the irregular reflecting portion over the regular reflecting portion because, in doing so, the overall light output efficiency tends to decrease.

Figure 2:
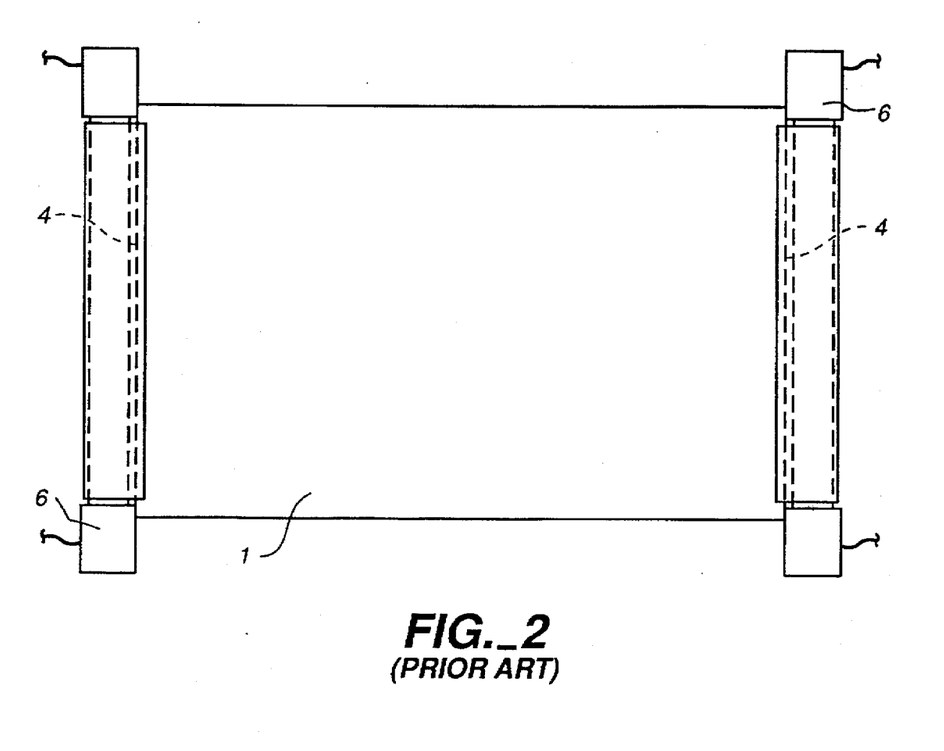
FIG. 2 is a plan view of another conventional background lighting apparatus as known in the art.

FIG. 2 illustrates another conventional background lighting apparatus principally consisting of light sources and a light guiding system. Light sources 6 are provided at opposite ends of transparent plate 1 adjacent to its edge surfaces 4. The design of this conventional apparatus has low luminance and is insufficient as a backlighting apparatus for a liquid crystal display structure, primarily in the case of a color display, because the color illumination is not uniform across the display. On manner of solving this problem is simply to increase the luminance of the light sources. However, this accompanied by a corresponding increase in exothermic generation, i.e., heat generation, which greatly effects the quality of the color image that is produced. Moreover, there is the situation that the temperature rise is greatest in the vicinity of the light sources 6 at opposite ends of plate 1 so that the heat generated is greatest at the vicinity of plate edges 4 and drops exponentially from these edges toward the center of transparent plate 1. As a result, the view of an image is not uniform across the display. This is because the threshold voltage for operation of the plurality liquid crystal elements of the liquid crystal display are affected by the temperature distribution generated by the background lighting apparatus. As a result, the threshold voltage of operation of the liquid crystal elements will shift and be different in regions of the display where the temperatures are different in the display structure. Thus, if the applied voltage level for the liquid crystal elements changes and is different in different locations of the display matrix, a significant problem is created in overall control of the display. This, in particular, has an affect on display of gray scale since a shift in light/voltage characteristics due to temperature differences will also shift the limited range of applicable gradation, particularly in the case of color displays.

The backlighting in liquid crystal displays has also been provided on the read surface or side of the liquid crystal structure. In order to provide uniform illumination with evenly distributed light intensity and luminescence, high luminance is required. In order to meet the requirements of uniformity in illumination, it is also necessary that a uniformity in temperature distribution be maintained. This is highly important from a standpoint of operational characteristics of the display since the transmissivity of the liquid crystal material is a function of temperature and can vary in a significant manner depending upon ambient temperature operating conditions. Therefore, if the surface temperature at the back surface of the display structure differs at different locations of the display, there is a serious problem in terms of nonuniformity in luminance and color output quality in operation of the display. Thus, the uniformity in temperature distribution across the display structure and, correspondingly, luminance uniformity are critical to producing a commercially acceptable liquid crystal display system.

It is, therefore, an object of this invention to provide a background lighting apparatus for liquid crystal display panels or structures, or other such displays requiring background lighting, having high luminous efficiency and uniformity in luminance with a uniform temperature distribution across the display structure.

SUMMARY OF THE INVENTION

According to this invention, a background lighting apparatus comprises a transparent plate with a peripheral edge surface functioning as a light input region that has two major surfaces having high internally reflecting quality and wherein a diffusion system is provided on one of the major surfaces of the plate and comprises a pattern of diffusion elements spatially formed over its surface. The pattern of diffusion elements may be in the form of pixels, squares, dots, circles, rectangles, etc., such as, opaline color pixels, points, dots, squares, or linear bars. A plurality of elongated light sources are provided substantially along the entire periphery of the transparent plate with means for aiding in directing the light beams into the interior of the plate for dispersion, diffusion and total internal reflection until a portion of the light beams exits through the other of the major surfaces of the transparent plate. With the introduction of light into the transparent plate along all edge surfaces of the plate, the transfer of light into the plate is accomplished with high uniformity and efficient dispersion. The transparent plate may have a geometrical configuration that is rectangular or polygonal or circular in nature.

In a further aspect of this invention, the pattern of diffusion elements wherein the area ratio of the size of the diffusion elements size relative to its surface monotonically increases from the peripheral edge surface to the center of the transparent plate at which point the area ratio is maximum. The monotonical increase in area ratio to the center of the transparent plate is preferably a bell-shaped type of configuration in nature.

By providing the means for light input to the transparent plate along the entire outer peripheral edge surface of the plate, it is possible to provide a high quality illumination background lighting apparatus which achieves a high level of brightness with uniform luminescent distribution across the apparatus. The effective brightness can be further increased by providing more light input edge surfaces, such as, as can be obtained from a transparent plate that has a polygonal or circular shape. Since additional brightness is being achieved through light input along the entire peripheral edge surface, the intensity of the lamps employed for the light input need not be comparatively as high as that employed in prior art apparatus. Further, the temperature generated and distributed across the surface of the apparatus will be substantially more uniform in nature. Since color and brightness uniformity in a LCD color panel are directly affected by different ambient temperatures and temperature changes, the employment of the background lighting apparatus of this invention has a significant advantage of improving the quality and operating characteristics associated with the achievement of higher levels of uniformity both with respect to luminance and color of an LCD color panel.

Because of thinness achieved in the background lighting apparatus of this invention, a highly thin LCD panel/background lighting apparatus can be achieved having a total thickness of only 15 mm to 20 mm. Thus, the apparatus of this invention lends itself to profound utility relative to wall hung TV screens and displays for use in the home as well as a screen display application in vehicle navigation system utilizing satellite communication for display map information and for visually tracking distance, location and direction of the vehicle.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Figure 3:
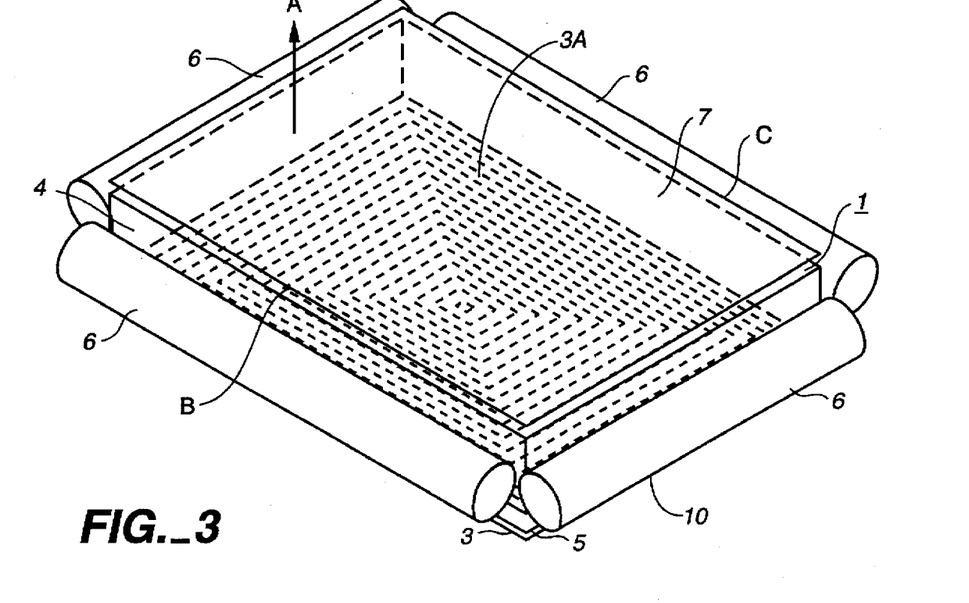
FIG. 3 is a perspective view of one embodiment of a background lighting apparatus of this invention.

Reference is now made to FIG. 3 wherein there is disclosed one embodiment of this invention for a background lighting apparatus having transparent plate 1 of plastic material, such as PMMA, with a uniform thickness in the range of 1 mm to 5–6 mm. If the plate thickness is reduced much below 1 mm, plate planar strength is reduce to such an extent that the plate is continually in a warped condition and, therefore, not useful for the uniform dispersion and reflection of light from one of its major surfaces. Plate 1 may also be made from polycarbonate, polystyrene or glass. Each of the adjacent side or end faces 4 of plate 1 are provided with a light source 6 which may be comprised of elongated fluorescent lamps, but can also be other types of light sources, such as, an aligned arrangement of LEDs. Transparent plate 1 is positioned between diffusion plate 7 and white type, total reflecting plate 3. A diffusion system 5 is provided relative to the bottom surface of transparent plate 1, i.e., between plate 1 and total reflecting plate 33. Diffusion system 5 may be applied to the bottom surface of plate 1 or may be a layer adhesively applied to the bottom surface of plate 1. Diffusion system 5 comprises a pattern 3A of milky white fine solid lines or dotted or dash lines of constant or varying width on the bottom surface of plate 1 or on the surface of reflecting plate 3. Pattern 3A may be printed by means, for example, of silk screen printing. Pattern 3A of dotted lines are rectangular in shape and the pattern is a concentric configuration with decreasing concentricity in size toward the center of transparent plate 1. The pattern has a high dispersion capability as well as a reflecting capability so that the reflected light also is dispersed in a multitude of different directions.

Other methods of forming these fine lines of diffusion system 5 may be utilized, such as, a white coating via a mask prepared on reflecting plate 3 or the formation of white adhesive tape strips on reflecting plate 3. Thus, the pattern of fine dash lines may be formed on the one surface of transparent plate 1 or may be formed on a film or layer applied to one surface of transparent plate 1.

Figure 3A:
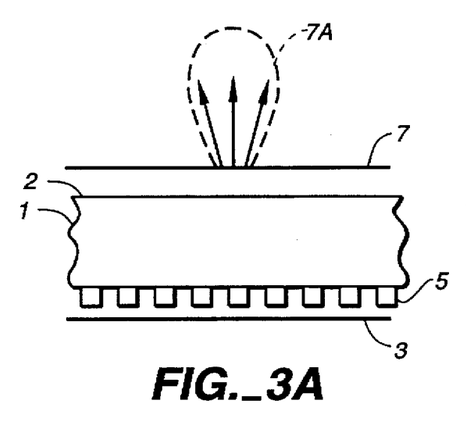
FIG. 3A is an illustration of the brightness distribution of the diffusion film used in this invention.
Figure 3B:
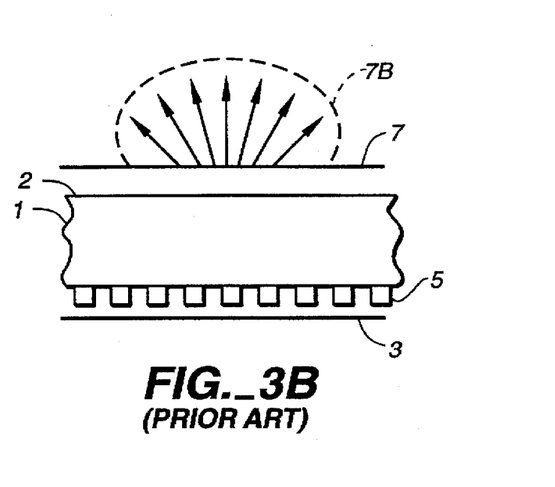
FIG. 3B is an illustration of the brightness distribution of the diffusion film of the prior art.

Diffusion plate 7 in all embodiments of this invention has a frosted texture so that it is opaque in nature. A function of diffusion plate 7 is to blur together, as view by the viewer from exit surface 2, the pattern 3A of features, i.e., dots, pixels, etc. of diffusion system 5 so that pattern 3A is not perceptible to the human eye. Another function of diffusion film 7 is to cause the light exiting from surface 2 to form a vertically extended lobar pattern 7A, as illustrated schematically in FIG. 3A. This type of light exit from the surface of film 7 is due to the irregularity of the front surface of the film. This provides for higher output brightness compared to prior art diffusion films that provide for a wide base diffusion deployment pattern 7B that is schematically illustrated in FIG. 3B. Such a pattern provides for a wide angle dispersion of light and, therefore, reduces the overall brightness of exiting light.

Thus, diffusion film 7 permits the passage of light with high brightness whereas reflector plate 3 (or reflector plate 8 in later embodiments) is designed to disperse as well as reflect as much light as possible. Film 7 may be a polycarbonate (PC), PE, PMMA or the like. Examples are PC diffusion film available from Bayer Chemical, Lexan film from General Electric Company, and sheet prism from 3M Corporation.

Light or light beams produced from light sources 6 enter plate 1 via four end faces 4 and is guided internally therein while undergoing multiple or repeated reflections and diffusion by means of diffusion system 5, reflecting plate 3 and transmissive/diffusion plate 7. These multiple reflections of light are enhanced due to the presence of a slight air gap preferably formed between diffusion plate 7 and transparent plate 1 and also a slight air gap formed between reflecting plate 3 and transparent plate 1. As a result, the multiple reflected light spreads throughout the volume of transparent plate 1 and finally a portion thereof exits through surface 2 at the proper exit angle, i.e., at the critical angle, which is discussed later, through diffusion plate 7, as indicated by arrow A, providing a light output of uniform distributed brightness.

Figure 4:
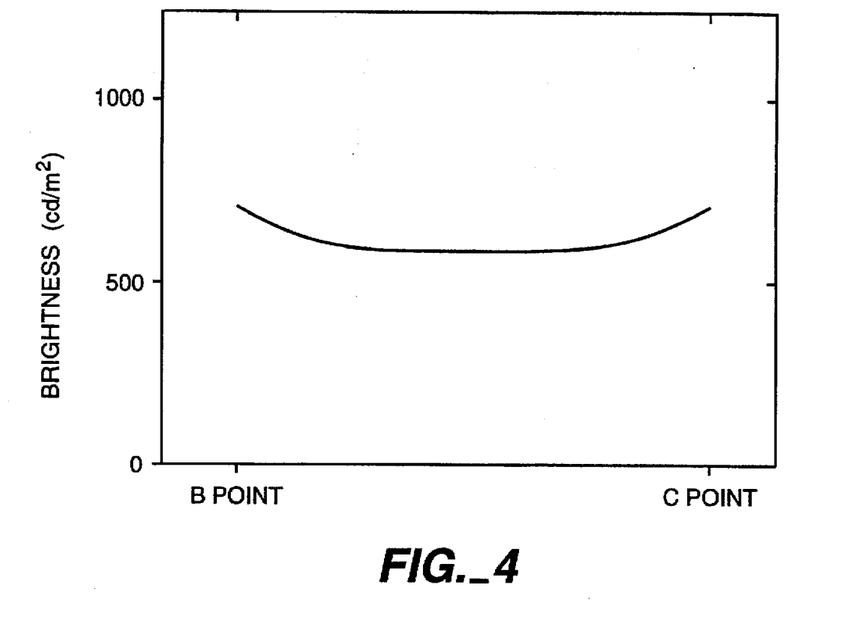
FIG. 4 is a graphic illustration of the brightness dispersion upon illumination of the background lighting apparatus of FIG. 3.

FIG. 4 shows the brightness dispersion when the background lighting apparatus of FIG. 3 is illuminated by light sources 6. The measured brightness was accomplished laterally across the upper face of diffusion plate 7 from edge B to edge C, as indicated in FIG. 3, employing a luminance meter which is continually swept across the plate surface. As is clearly noted from FIG. 4, the brightness of the light across this surface of plate 7 has substantial uniformity.

Figure 5:
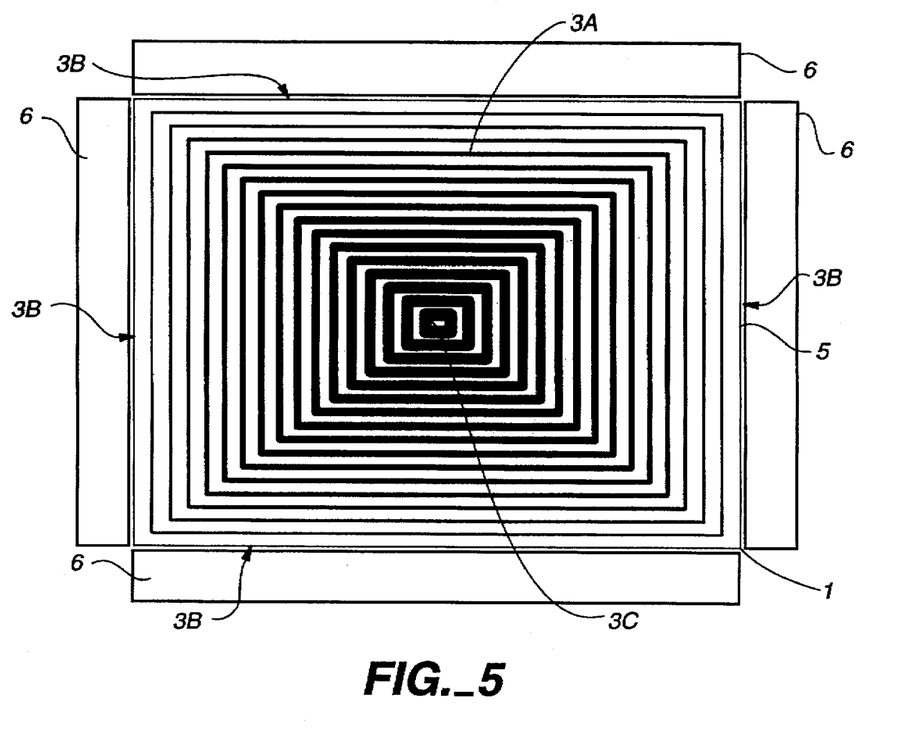
FIG. 5 is a plan view of a pattern for an diffusion system employed in the background lighting apparatus of FIG. 3.

FIG. 5 illustrates details of another diffusion system 5 comprising a pattern of lines in the form of concentric rectangles. The arrangement of four light sources 6 about the entire periphery of transparent plate 1 and the pattern of fine lines for diffusion system 5 are formed rectilinearly relative to transparent plate 1 providing for greater light output so that total brightness is as high as possible. The total brightness of the light output of these embodiments is significantly higher than the embodiments shown in FIGS. 1 and 2. Also, line width of pattern 3A for diffusion system 5 monotonically increases from edge portions 3B to center region 3C while the pattern line pitch remains unchanged. Alternatively, as explained in Ser. No. 07/525,408 filed May 18, 1990, which is incorporated herein by reference thereto, the pitch of the pattern lines for diffusion system 5 may be monotonically decrease from edge portions 3B to center region 3C while the line width of pattern 3A remains unchanged.

The pattern in FIG. 5 may alternatively be a series of dotted or dash lines, such as in the case of FIG. 3, rather than sold lines wherein the width of the dash lines increases from edge portions 3B to center region 3C. Thus, the dashed line widths would be the smallest in the four corner regions of plate 1. As a further alternative, the dashed line segments may also monotonically increase in length from edge portions 3B to center portion 3C. As a still further alternative, the dashed line widths may monotonically increase in width from the four corner regions of transparent plate 1 in both orthogonal directions of plate 1, i.e., the horizontal and vertical directions, so that their line thicknesses increasing become larger from the four corner regions of plate 1 to central horizontal axis of plate 1 as well as a vertical central axis of plate 1 and are the largest in central region 3C.

Figure 6A:
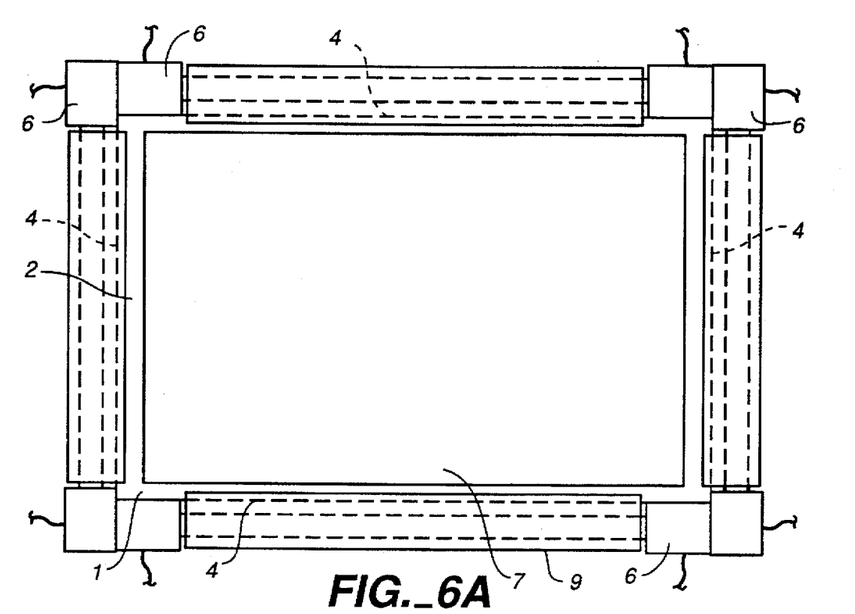
FIG. 6A is a plane view of another embodiment of a background lighting apparatus of this invention.
Figure 6B:
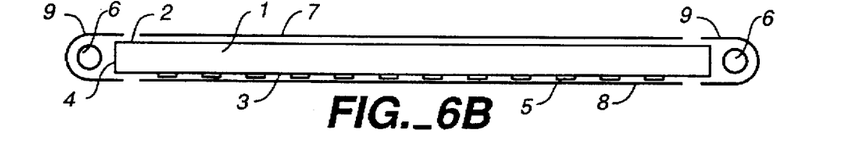
FIG. 6B a sectional side elevation of the embodiment shown in FIG. 6A.

Reference is now made to another embodiment shown in FIGS. 6A and 6B. The background lighting apparatus of this embodiment comprises a transparent plate 1 which is substantially rectangular in shape and of a uniform thickness. Plate 1 may be composed of a transparent or light transmissive material which exhibit a small amount of photo-absorption and has a refractive index larger than air. The refractive index is preferably 1.41 or larger. At this level of index, a critical angle for exit of light from the apparatus will be about 45° or less. The material of plate 1 may be, for example, acrylic resin, polycarbonate resin, polystyrene resin or glass. Plate 1 has one major surface which is a light exit surface 2, which is the light output to accompanying liquid crystal display panel. The other major surface of plate 1 is termed a non-exit surface 3. Surfaces 2 and 3 are at substantially orthogonal to light input end surfaces 4 of plate 1. Both of these flat major surfaces are configured to smooth, specular surfaces. All light beams incident on end surfaces 4 of plate 1 are internally reflected by surfaces 2 and 3.

Means is provided for diffusing the light beams entering plate 1 in the form of diffusion system 5 which is provided relative to non-exit surface 3 of plate 1. The pattern comprising diffusion system 5 may be printed on this surface or added by means of an adhesive or in other convenient manner. The pattern of diffusion system 5 provides a plurality of light diffusing elements forming reticulated points, dots, dashes, squares, polygons, rectangles, or fine lines and have a predetermined distribution relative to surface 3. Such a predetermined arrangement is provided so that the light beams entering plate 1 via edge surfaces 4 are totally internally reflected by surfaces 2 and 3 of transparent plate 1, which surfaces are substantially orthogonal to the edge surfaces 4 and, therefore, the light beams travel extensively into the interior or central portion of plate 1. In contrast, some beams reach diffusion system 5 and are deflected, diffused and scattered at a proper angle for exit from the apparatus via exit surface 2.

It is preferred that transparent plate 1 be tabular in form and that all surfaces constituting transparent plate 1 be internally reflecting surfaces so that the contribution of edge surfaces 4 be small relative to any involvement relative to the function of transmissive to light or the exiting of light, such as, in the case of exit surface 2 and non-exit surface 3. In any regard, there is a point of increased probability at which the light beams are being totally internally reflected within the confines of plate 1 and will remain within the confines of plate 1 due to its internally reflective nature. However, because of the multitude of reoccurring internal light reflections, light exit efficiency increases significantly with the use of diffusion system 5. As a specific example, if transparent plate 1 comprises an acrylic plate having a substantially rectangular shape, the critical angle for light to exit from this plate is approximately 42 degrees. This critical angle, $\theta_1$, is an angle that is a larger acute angle, relative to the surface of transparent plate 1, than the angle of total reflection, $\theta_2$. Angle, $\theta_1$, is defined by:

$$\theta_1 = \sin^{-1} n_2/n_1,$$

where $n_1$ is the refractive index of plate 1 and $n_2$ is the refractive index of air.

It follows that the light beams will not exit from plate 1 if they travel to the opposite edge surface 4 from whence they enter plate 1 without being diverted or refracted to interact with diffusion system 5. Thus, the reflected light beams will not exit at the critical angle unless surfaces 2 and 3 are highly internally reflective in nature.

Referring again to FIG. 6A, a light source 6 is position adjacent to each end surface 4 of transparent plate 1 so that light beam is associated relative to substantially the entire periphery of plate 1. The light beams emitted from light sources 6 are directed into transparent plate 1 through the peripheral edge surfaces 4. Because light sources 6 are disposed about substantially the entire periphery of edge surfaces 4 of plate 1, the developed luminance is 2 to 4 times or higher as compared to conventional background lighting apparatus employing one or two lamp sources.

A fluorescent lamp may be employed relative to each light source 6. The size of the lamp may be smaller than in the case of conventional apparatus of FIGS. 1 and 2 since, in effect, the same amount of input light desired for proper backlighting may be spread out over an increase number of lamps. In fact, the diameter of sources 6 is the same as or smaller than the thickness of plate 1, as illustrated in FIG. 6B. The thickness of plate 1 may generally be, for example, about 4 mm. The diameter source tubes may be 3 mm or 4 mm. As a result, the total amount of heat generated from sources 6 is reduced due to the employment of smaller intensity lamp sources. Light sources 6 may include several kinds of light sources, such as, incandescent lamps or linearly arranged light emitting diodes with light introduction to plate 1 via optical fibers. However, the fluorescent lamp is preferred in terms of light emitting efficiency, wavelength, emission color, and adaptability to the configuration of the periphery of transparent plate 1.

As best shown in FIG. 6B, diffusion film 7 is provided relative to exit surface 2 of transparent plate 1 while irregular reflection plate 8 is provided relative non-exit surface 3. By "irregular", it is meant that reflection plate 8 has a light dispersion capability as well as a high reflecting capability so that the reflected light is also dispersed in a multitude of different directions while concurrently being totally reflected. Diffusion film 7 and irregular reflection plate 8 are disposed relative to respective surfaces 2 and 3 of plate 1 with a small air layer existing between these members and plate surfaces 2 and 3. The air layer is required in order to achieve total internal reflection dependent upon the critical angle. Plate 8 is a total reflection medium with diffusion capability whereas diffusion system 5 is a partial reflection medium with diffusion capability by means of a diffusion pattern over only a portion of the surface of non-exiting surface 3.

Diffusion film 7 diffuses and disperses the light beams exiting via surface 2 so that they exit in a uniform manner. Irregular reflection plate 8 functions to repeatedly return light beams through plate 1 to diffusion film 7 and, in turn, light beams are reflected by non-exiting surface 3 and passing through surface 3 after being diffused by diffusion system 5. Also, the light beams penetrating transparent plate 1, after being reflected by diffusion film 7, are again reflected and diffused and dispersed by diffusion system 5 and light beams penetrating non-exit surface 3 are also totally reflected and also diffused by irregular reflection plate 8. Diffusion system 5 also provides for a certain amount of intermediate light dispersion and scattering of the light entering side edges 4 with an immediate exit of a portion thereof through surface 2.

As shown in FIG. 6B, a reflection sheet 9 having an inner surface of high reflectivity level is formed in an U-shaped configuration to cover the outer exterior of light sources 6 to aid in the reflection and redirecting of the light beams from the lamp into end surfaces 4. Reflection sheet 9 may be constructed as a plastic sheet molded into an U-shaped configuration with the inner surface thereof deposited with a layer of white material layer, or with a silver or aluminum layer to produce a high reflecting surface. Because sources 6 are as small as or smaller than the thickness of plate 1, reflector shields may be curved around lamps 6 so as to add no greater thickness depth than the thickness of plate 1. Furthermore, since lamps 6 are completely confined to the area of edge surfaces 4 and enclosed by shields 9, maximum light input efficiency is achieved into side edges 4 of the light produced from light sources 6. This is not possible with light sources or lamps 6 having tube diameters larger than the thickness of plate 1.

Figure 7:
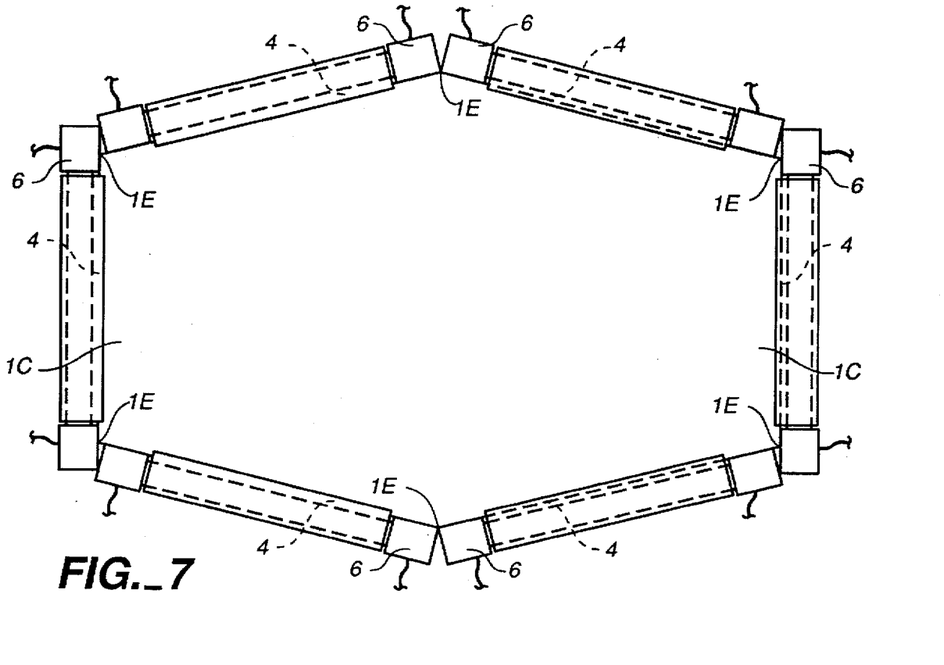
FIG. 7 is a plane view of a further embodiment of a background lighting apparatus of this invention.
Figure 8:
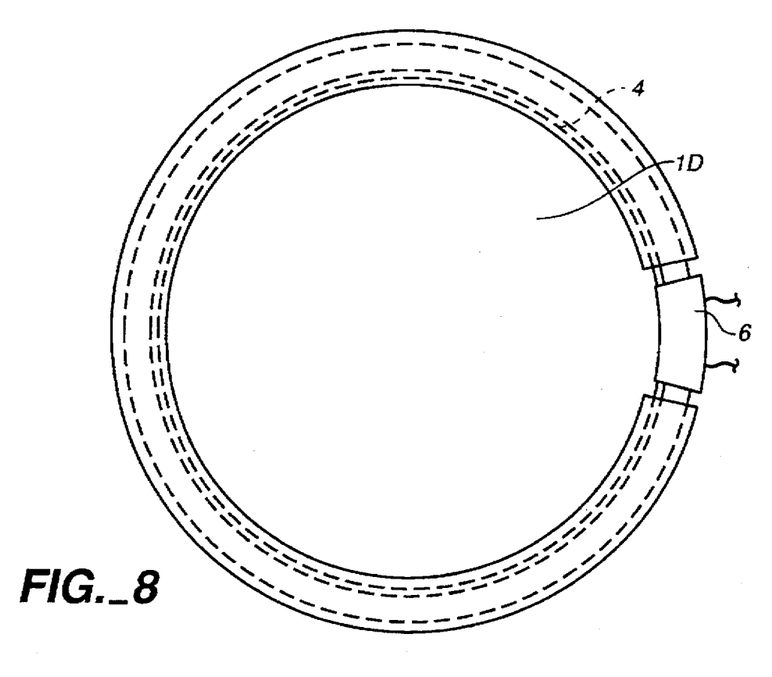
FIG. 8 is a plane view of a still further embodiment of a background lighting apparatus of this invention.

Transparent plate 1 may be formed of other types of geometric configurations, such as, a polygonal configuration or a circular configuration, whereby the outer periphery of the plate is comparatively made longer relative to substantially the same planar area. FIG. 7 illustrates a hexagon shaped plate 1C wherein the outer peripheral surface is longer by about 6% compared to the rectangular surface of FIG. 6A relative to a planar surface of about the same area. FIG. 8 illustrates a circle shaped plate 1D wherein the outer peripheral surface is longer by about 10% compared to the rectangular surface of FIG. 6A relative to a planar surface of about the same area. With these types of arrangements providing for an increase periphery, the light source is correspondingly extended in length to accommodate the increase in periphery so that a corresponding increase in luminance input into plate 1C or 1D is achieved per unit square area thereby increasing the overall brightness output from the background lighting apparatus.

Figure 9:
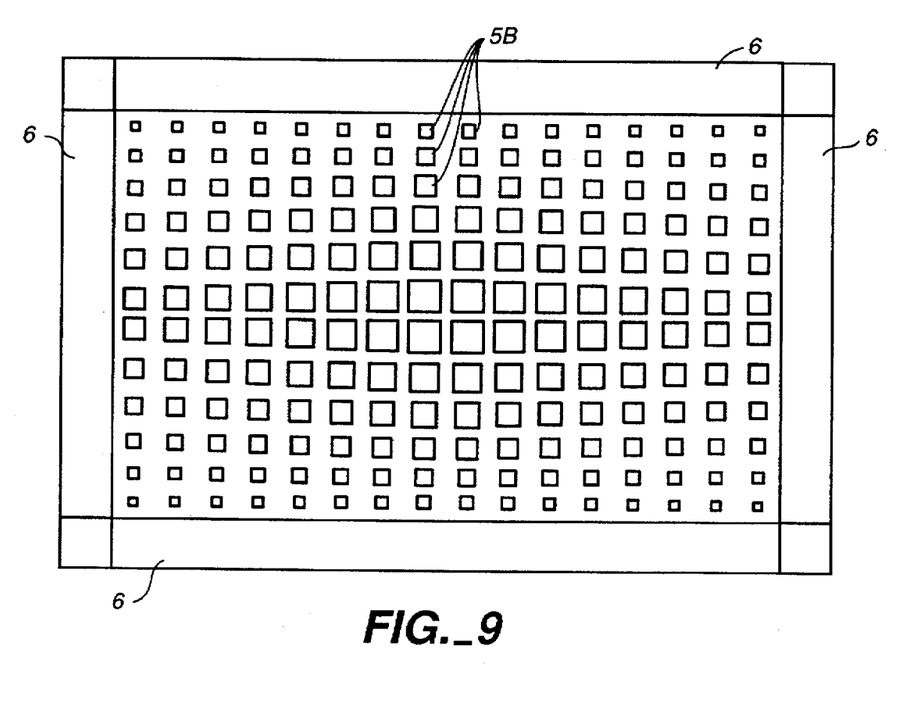
FIG. 9 is a specific illustration of an example of an embodiment of the pattern for a diffusion system for the background lighting apparatus of this invention.

In formation of a suitable pattern for the diffusion elements making up diffusion system 5, the area ratio, i.e., the ratio of a region covering non-exiting surface 3 by the diffusion pattern versus associated region not covered by the pattern, is small at regions in proximity to light sources 6 and is large in regions further away, particularly, regions central of plate 1. A preferred distribution pattern is illustrated in FIG. 9 in the case of diffusion elements 5B having a pixel, dot or point configuration. To be noted is that the pattern varies in the size of elements 5A across plate 1 in both orthogonal directions and the absolute value of the area ratio depends on the direction of progression of the pattern from any exterior edge point of plate 1 in a direction toward its center point. In particular, the area ratio of elements 5A are smallest at the four corners of the rectangular plate 1 and increase in area ratio progressively toward the center of the plate wherein they are the largest. Further, in both the vertical and central horizontal directions of the pattern commencing at the edge surfaces 4, as shown in FIG. 9, the area ratio of elements 5A also progressively increase to a respective central vertical and horizontal axis of the pattern or plate. Thus, the very center of the pattern or plate exhibits the maximum area ratio relative to the entire pattern while the far corners of the pattern or plate exhibit the minimum area ratio relative to the entire pattern. Of course, regions of maximum area ratio are different for the hexagon plate 1C in FIG. 7 wherein the minimum area ratio would at corner positions 1E, and are adjacent the entire peripheral edge surface 4 of plate 1D in FIG. 8.

The pitch between elements 5A is maintained constant and is chosen to be in the range of 0.5 mm to 2.0 mm, preferably within the range of 1 mm to 1.5 mm. If the pitch between elements 5A is made too large, an unevenness or nonuniformity in the light pattern being dispersed is created. On the other hand, if the pitch is too small, i.e., below 0.5 mm, it becomes difficult to maintain a uniform pitch in creation of the pattern. The pattern can be easily printed on surface 3 within the above mentioned pitch range.

Figure 10A:
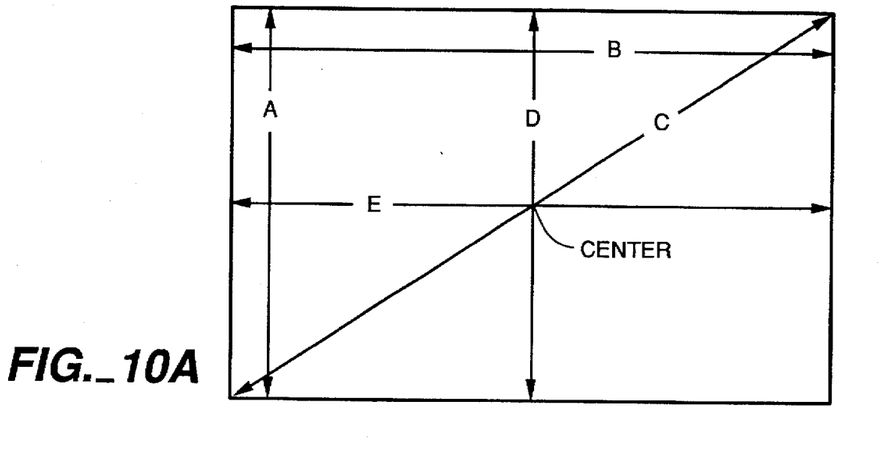
FIG. 10A is a graphic illustration of axis identification of axes A-E relative to area ratio distribution shown in FIG. 10B.
Figure 10B:
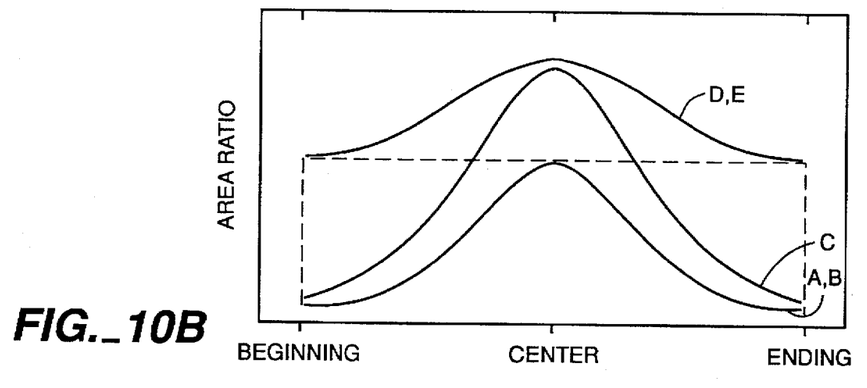
FIG. 10B is a graphic representation of the area ratio distribution along the different axes of FIG. 10A achieved with the pattern for the diffusion system illustrated in FIG. 9.

FIG. 10B graphically illustrates the distribution of area ratio of the diffusion pattern of FIG. 9 as viewed along axes A, B, C, D and E across the pattern as indicated in FIG. 10A. The distribution pattern is one of normal distribution or of a bell-shaped like configuration, and varies in greatest area ratio distribution between diagonally opposite corners of plate 1, such as, axis C, and varies in least amount of area ratio distribution along centrally located, orthogonally positioned axes D and E. The area ratio distribution is determined relative to optical and physical characteristics of transparent plate 1, such as, its refractive index, material of construction, and internally reflecting quality.

Figure 10C:
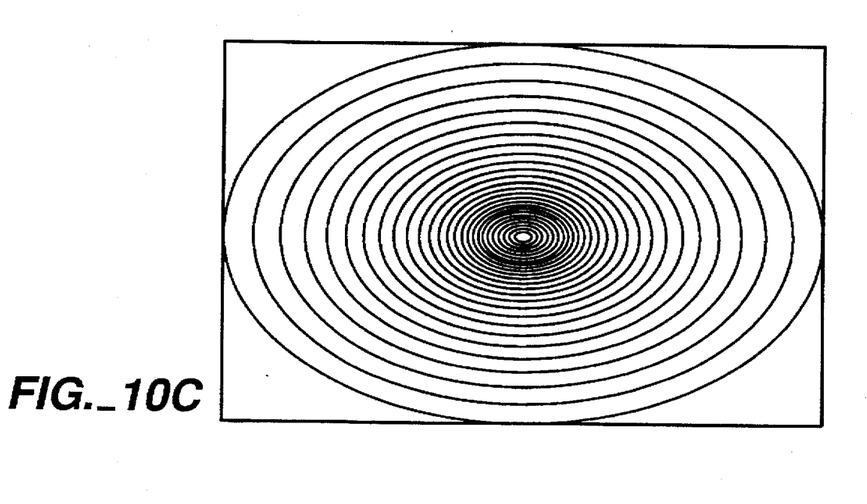
FIG. 10C is a contour line pattern relative to pattern element area density for the area distribution illustrated in FIG. 10B.

The pattern of diffusion elements 5A in FIG. 9 is merely one example of a suitable pattern, as the pixel or square pattern shown may be of other geometrical features, such as, circular, polygon, rectangular, etc. In any case, the area ratio is always greatest in the center of the pattern, i.e., the point furthermost from light source 6, and the smallest at the corners (or peripheral edge in the case of circular or elliptical shaped plates). In this connection, FIG. 10C illustrates the contour line pattern of FIG. 9 for the rectilinear shaped plate 1 as related to pattern area ratio density.

Figure 13A:
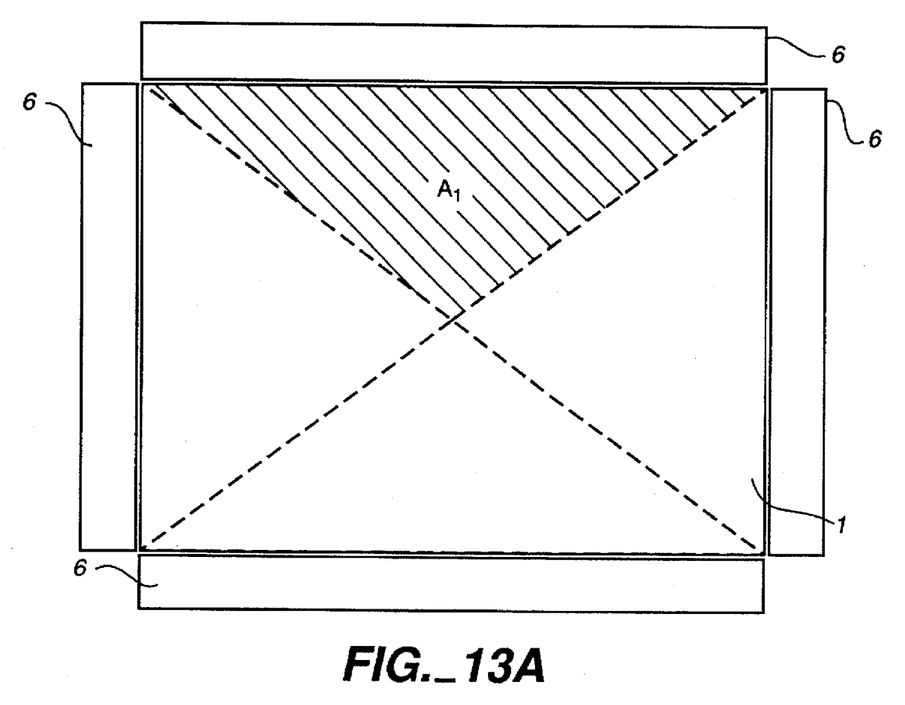
FIG. 13A illustrates the sectors of required light distribution and penetration in the case of a four lamp background lighting apparatus employing a rectilinear type plate.
Figure 13B:
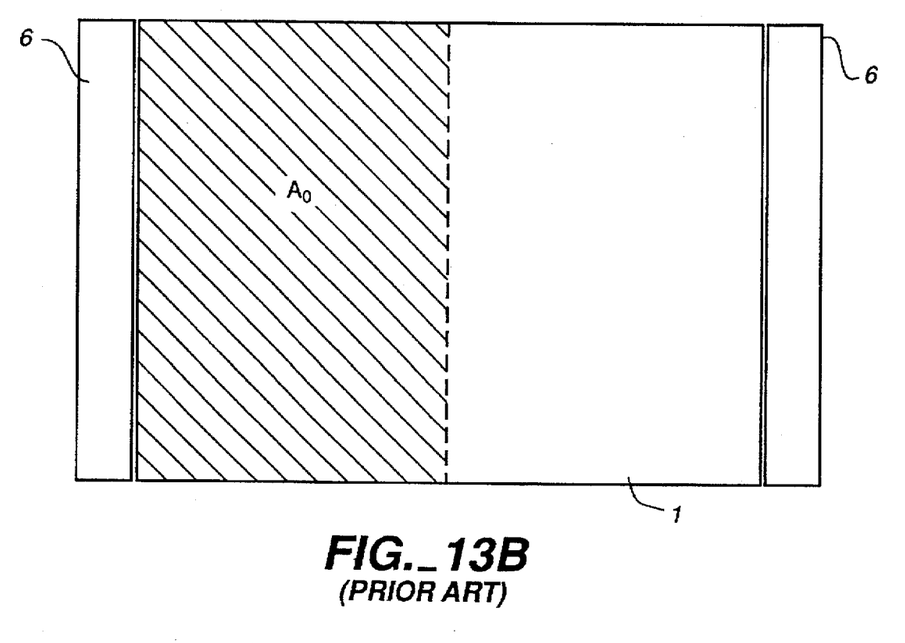
FIG. 13B illustrates the sectors of required light distribution and penetration in the case of a two lamp background lighting apparatus employing a rectilinear type plate.

With the employment of light sources 6 along substantially the entire outer periphery of plate 1, the light beams incident on end surfaces 4 are substantially multidirectional into plate 1 as compared to the case wherein only two lamps are employed in conventional background lighting apparatus. Since the central region of diffusion system 5 contains the maximum area ratio of the pattern, the reach or penetration range of the incident beams on edge surfaces 4 may be generally confined to selectively more narrower regions of plate 1 so that, as a result, the luminance distribution into plate 1 tends to be highly uniform. This is illustrated in FIG. 13A wherein the light must be distributed into and dispersed about four sectors of area $A_1$ of plate 1 via the light provided from four lamps 6. However, in the case of the prior art shown in FIG. 13B, the region of distribution of dispersion comprises two sectors of area $A_0$ of plate 1 via the light provided from two lamps 6. The requirement of light penetration into the interior of plate 1, while being uniformly distributed, is greater relative to area $A_0$ compared to area $A_1$. In fact, the greatest length of reach or penetration of light in area $A_1$ is to the center point of plate 1, at which region the extent of reach or penetration is minimal compared to area $A_0$, since $A_0$ has the same or identical penetration along the full extent of its deepest penetration into plate 1. Further, the amount of required area coverage and penetration of light into plate 1 is inversely proportional to the number of lamps 6 employed for plate 1.

Figure 11:
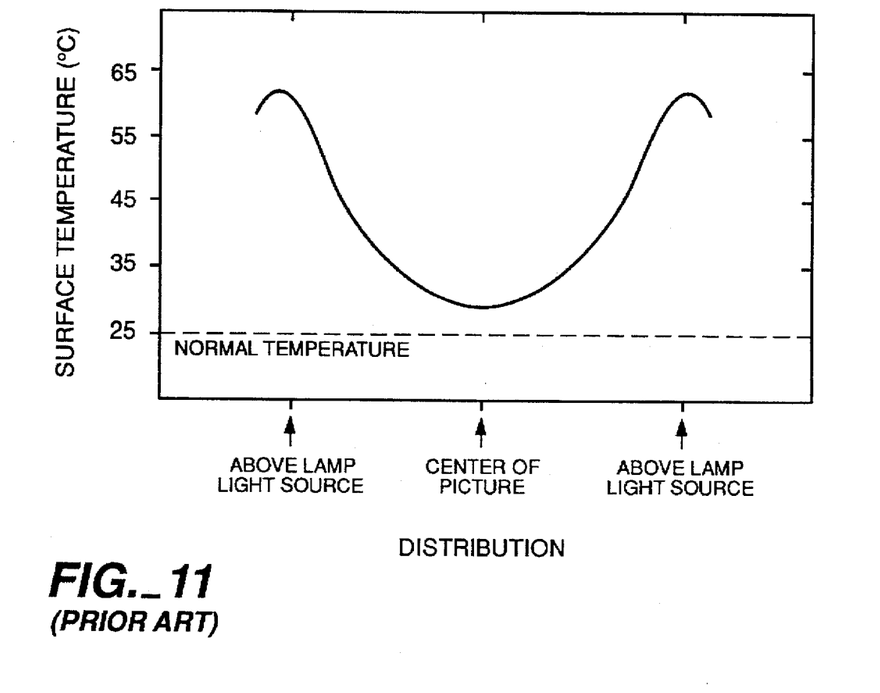
FIG. 11 illustrates the temperature distribution across the surface of a liquid crystal panel due to heat generated and transmitted from an underlying conventional background lighting apparatus.

FIG. 11 is a graphic illustration showing a temperature distribution across an LCD panel surface in conjunction with an adjacently disposed conventional background lighting apparatus. It should be noted that the amount of current necessary to the light sources of the conventional two lamp lighting system must be increased two-fold to equal the luminance level achieved in the embodiment shown in FIG. 6A. In the case here, it can be seen that the temperature distribution imposed upon the panel is greatly increased in the regions in proximity to the light sources wherein temperatures on the panel is as much as 30° to 40° higher the normal operating temperature of 25°.

Figure 12:
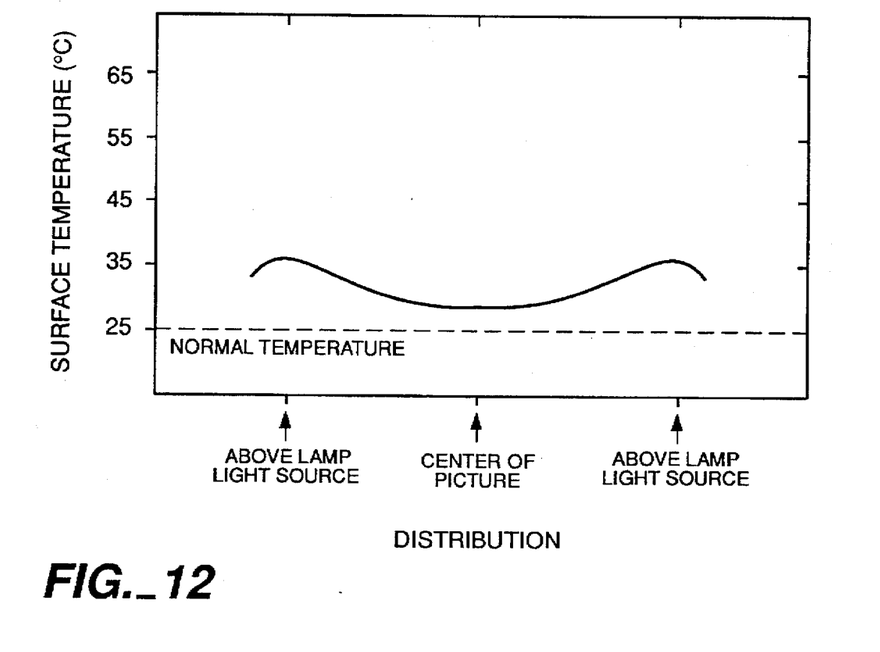
FIG. 12 illustrates the temperature distribution across the surface of a liquid crystal panel due to heat generated and transmitted from an underlying background lighting apparatus of this invention.

FIG. 12 is a graphic illustration showing a temperature distribution across an LCD panel surface in conjunction with an adjacently disposed background lighting apparatus of the type shown in FIG. 6A. It can be readily seen that, in comparison with the results of FIG. 11, that the temperature distribution is still higher adjacent to the light sources compared to the center of the LCD panel but the temperature distribution is of significantly more uniform distribution across the plate and, therefore, highly desirable relative to obtaining uniformity in operational and color characteristics in display output.

In conventional, present day LCD background lighting apparatus, two light sources 6 are generally employed at opposite ends of transparent plate 1, as illustrated in FIG. 1. These two lamps, therefore, require high flux output and, therefore, must be driven at high currents. In utilizing high current applications, it is not possible to use smaller diameter fluorescent tubes because they cannot handle the higher applied current. The necessary light flux required by these two lamps as well as a significant enhancement in light input distribution and uniformity into plate 1 is achieved with the use of four lamps as disclosed in the various embodiments of this invention. The light output can correspondingly be reduced per lamp in the four-lamp configuration over the two-lamp configuration so that the necessary driving current for each of the lamps can correspondingly be reduced by 30% to 50%. As a result, there is less heat generated for the four-lamp configuration with greater uniform distribution of the heat generated, as illustrated in FIG. 12. Furthermore, the corresponding environmental operating temperature of the background lighting apparatus is also reduced by 30% to 50%. Therefore, the tube diameter of fluorescent lamps can be made correspondingly smaller by 20% to 50% since less light is required from each lamp. Lastly, the thickness of transparent plate 1 can be correspondingly reduced by about 10% to 50%. Thus, it is possible to make the diameter of fluorescent lamps 6 as small as or smaller than the thickness of plate 1, e.g., the present tube diameter of fluorescent lamps 6 employed in the configuration of FIGS. 6A and 6B can be 4 mm and transparent plate 1 may have a thickness in the range of 4 mm to 5 mm. Thus, more distribution of light into plate 1 via more light sources provides for lower light flux per light source and, therefore, lower operating current, which permits the use of smaller diameter fluorescent tubes that are equal to or less than the thickness of plate 1 and a resulting increase in the efficiency of light input into side edges 4 in the range of about 35% to 38%. Furthermore, the overall heat generated is reduced and is more uniformly distributed across plate 1 so as to have a uniform effect on electrical operating characteristics of an adjoining LCD panel.

Figure 14:
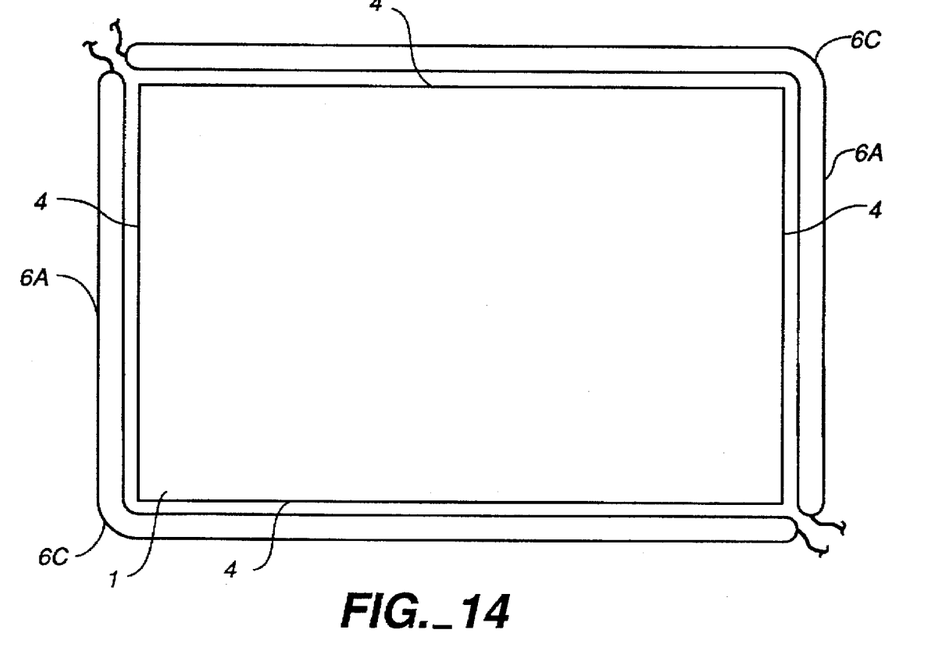
FIG. 14 illustrates another embodiment of this invention utilizing two L-shaped fluorescent lamps each covering two edges of a rectilinear plate of a background lighting apparatus.

FIG. 14 shows another embodiment of this invention wherein a new fluorescent lamp configuration is illustrated relative to transparent plate 1. Lamps 6A are of L-shaped configuration wherein two lamps are formed to extend along two adjacent, right angled side edges 4 each having one right angled corner 6C. Not only does this configuration provide for a reduced number of lamps required for peripheral light input to plate 1 and, therefore, a reduction in lamp cost, but also reduces the requirement of lamp drivers from four to two, which provides for a further significant reduction in cost of the background lighting apparatus.

Figure 15:
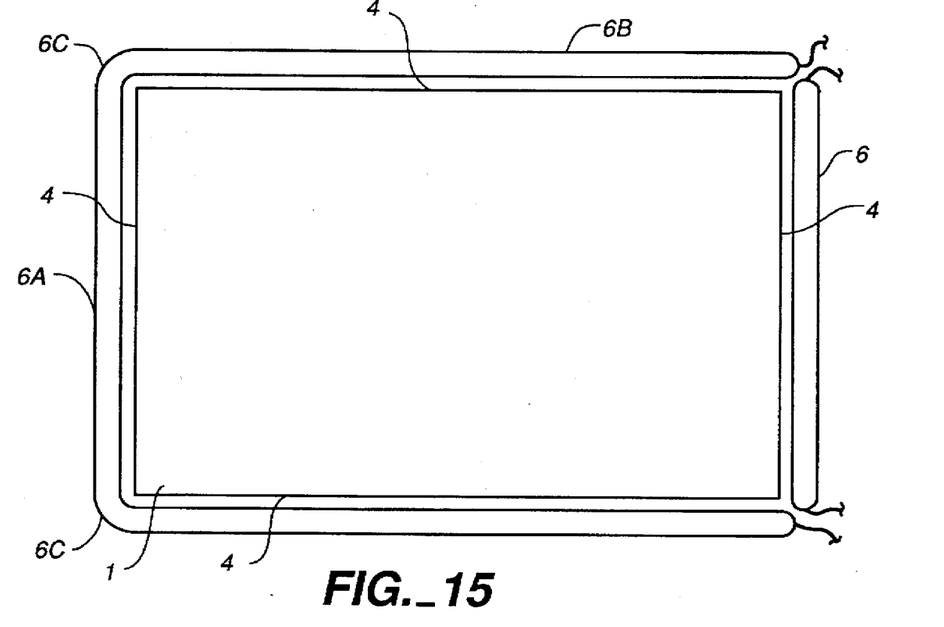
FIG. 15 illustrates another embodiment of this invention utilizing a U-shaped fluorescent lamp covering three edges of a rectilinear plate of a background lighting apparatus.

FIG. 15 shows a further embodiment of this invention wherein a new fluorescent lamp configuration is illustrated relative to transparent plate 1. Lamp 6B has a U-shaped configuration and extends as a single lamp around three side edges 4 of plate 1 and includes two corners 6C. The remaining side edge 4 is provided with a single straight-length fluorescent lamp 6.

Fluorescent lamps 6A and 6B have been recently achieved to successfully operate with right angled corners 6C built into the lamp tube structure.

Thus, in accordance with the foregoing embodiments of this invention, a high intensity color picture is achieved over the entire surface of the LCD panel with significantly enhanced as well as highly discernible uniformity of color due to an applied, more uniform distribution of temperature across the panel as depicted in FIG. 12. In comparative applications of the conventional background lighting apparatus to the background lighting apparatus of this invention, such as in the case of a MIM type active color LCD panel or an STN type passive color LCD panel packaged to evaluate nonuniformity in color output and overall luminance, the conventional background lighting apparatus is not practical without utilizing an additional special light radiating means, such as, in the form of a U-shaped bent aluminum reflection sheet or plate positioned beneath the background lighting apparatus and around its edges including the light sources. Not only does such a light radiating means undesirably retain heat but also undesirably contributes to a greater thickness of the background lighting apparatus.

While the invention has been described in conjunction with several specific embodiments, it is evident to those skilled in the art that many further alternatives, modifications and variations will be apparent in light of the forgoing description. Thus, the invention described herein is intended to embrace at such alternatives, modifications, applications and variations as fall within the spirit and scope of the appended claims.

What is claimed is:

1. A background lighting apparatus for an adjoining LCD panel having enhanced luminance and thermal uniformity thereacross comprising:

a transparent plate having two major surfaces providing a high level of internal reflection for light below a critical angle, a peripheral edge surface around a perimeter of said plate functioning as a light input to the interior of said plate, one of said major surfaces functioning as a light output from said apparatus for light above said critical angle, a distributed diffusion system formed relative to at least the other of said major surfaces to diffuse and reflect light entering the interior of said plate and permit light at or above said critical angle to output through said one major surface, and a fluorescent-type light source configured to uniformly follow said peripheral edge and provide a continuous light input uniformly along said the entire peripheral edge of said plate so that for a required light level input, the amount of light flux is reduced due to the continuity of said light source along said edge permitting the utilization of smaller light source and, correspondingly, providing a reduction in the overall light source heat generated as well as provide even heat transfer distribution across said plate wherein electrical operating characteristics of said adjoining LCD panel are affected evenly thereacross.

2. The background lighting apparatus of claim 1 wherein said transparent plate has a geometric shape which is substantially rectangular, circular or polygonal.

3. The background lighting apparatus of claim 1 wherein said diffusion system comprises a pattern of separate diffusion elements formed relative to said other major surface wherein an area ratio of size of said diffusion elements monotonically increases from said peripheral edge surface of said plate to the center of said plate wherein the area ratio of size of said elements is maximum.

4. The background lighting apparatus of claim 3 wherein the area ratio of size of said diffusion elements monotonically increases from said peripheral edge surface of said plate to the central region of said plate in a normal distribution pattern.

5. The background lighting apparatus of claim 3 wherein said transparent plate has a geometric shape which is substantially rectangular, circular or polygonal.

6. A background lighting apparatus for an adjoining LCD panel comprising:

a transparent plate having two opposite major surfaces, one of said major surfaces including means to disperse, diffuse and otherwise redirect light in an interior portion of said plate and the other of said major surfaces functioning as an exit surface for light from said plate interior portion, said plate having a peripheral edge functioning along its full length as a light input into said plate interior portion, a plurality of elongated tubular fluorescent light sources positioned uniformly and continuously along and adjacent to said peripheral edge such that substantially the entire periphery thereof functions as a light source input wherein light is provided into said plate interior portion substantially along the entire periphery of said plate, said light sources having a dimensional width equal to or less than the thickness of said plate, said light sources providing a uniform light flux input along said peripheral edge permitting a reduction in the total amount of required light flux for said apparatus and correspondingly a reduction in the overall light source heat generated from such light sources so that both generated light and heat are uniformly distributed into the interior of and across the planar extent of said plate wherein electrical operating characteristics of said adjoining LCD panel are uniformly affected thereacross.

7. The background lighting apparatus of claim 6 wherein said transparent plate has a thickness in the range of 1 mm to 6 mm.

8. The background lighting apparatus of claim 7 wherein said light sources are elongated fluorescent lamps having a tube diameter in the range of 3 mm to 4 mm.

9. The background lighting apparatus of claim 8 wherein said plate is rectilinear or polygon shape, at least one of said elongated fluorescent lamps having a length and intermediate bent section to correspond along at least two angularly disposed edge surfaces of said plate peripheral edge.

10. A background lighting apparatus comprising:

a transparent plate having two opposite major surfaces, one of said major surfaces including means to disperse, diffuse and otherwise redirect light in an interior portion of said plate and the other of said major surfaces functioning as an exit surface for light from said plate interior portion, said plate having a peripheral edge functioning as a light input into said plate interior portion, a plurality of elongated light sources formed continuously along and adjacent to said peripheral edge such that the entire periphery thereof provides a light source input wherein light is provided uniformly into said plate interior portion substantially along the entire periphery of said plate, said light sources having a dimensional width equal to or less than the thickness of said plate, said one major surface including a diffusion pattern that contains a plurality of separate light dispersing features wherein area ratio of size of said light dispersing features monotonically increase from said plate peripheral edge of said plate to a central region of said plate wherein the area ratio size of said features is maximum, said other major surface including a diffusion means permitting transmission of light therethrough, renders said diffusion pattern visually indiscernible as viewed externally from said other major surface and causing light exiting therethrough to leave said plate in a lobar pattern formation.

11. The background lighting apparatus of claim 10 wherein said plate has a thickness in the range of 1 mm to 6 mm and said light dispersing features having a spatial pitch in the range of 0.5 mm to 2.0 mm.

12. The background lighting apparatus of claim 11 wherein said pitch is uniform across said diffusion pattern.

13. The background lighting apparatus of claim 10 wherein said light sources are elongated fluorescent lamps having a tube diameter in the range of 3 mm to 4 mm, said plate having a thickness in the range of 4 mm to 6 mm.

14. The background lighting apparatus of claim 13 wherein said plate is rectilinear or polygon shape, at least one of said elongated fluorescent lamps having a length and intermediate bent section to correspond along at least two angularly disposed edge surfaces of said plate peripheral edge.

15. The background lighting apparatus of claim 1 employed with said adjoining LCD panel in a display apparatus.

16. The background lighting apparatus of claim 6 employed with said adjoining LCD panel in a display apparatus.

17. The background lighting apparatus of claim 10 employed with an adjoining LCD panel in a display apparatus.

18. The background lighting apparatus of claim 1 wherein said adjoining LCD panel is a color display.

19. The background lighting apparatus of claim 6 wherein said adjoining LCD panel is a color display.

20. The background lighting apparatus of claim 10 employed with an adjoining LCD panel in a color display apparatus.

* * * * *